United States Patent [19]
Nishiura

[11] Patent Number: 5,999,296
[45] Date of Patent: Dec. 7, 1999

[54] OPTICAL HEAD OF OPTICAL BEACON

[75] Inventor: Yozo Nishiura, Nagoya, Japan

[73] Assignees: Harness System Technologies Research Ltd., Nagoya; Sumitomo Wiring Systems, Ltd., Yokkaichi; Sumitomo Electric Industries, Ltd., Osaka, all of Japan

[21] Appl. No.: 08/864,623

[22] Filed: May 28, 1997

[30] Foreign Application Priority Data

Jun. 17, 1996 [JP] Japan ................................. 8-155290
Jun. 17, 1996 [JP] Japan ................................. 8-155679

[51] Int. Cl.$^6$ ............................. H04B 10/00; B60Q 1/00
[52] U.S. Cl. ..................... 359/152; 359/142; 359/143; 359/152; 359/155; 359/154; 340/461
[58] Field of Search ................................. 359/142, 143, 359/144, 145, 155, 159, 169, 170, 180; 340/461

[56] References Cited

U.S. PATENT DOCUMENTS

| | | | |
|---|---|---|---|
| 4,325,146 | 4/1982 | Lennington | 455/604 |
| 5,073,979 | 12/1991 | Webb | 359/142 |
| 5,117,301 | 5/1992 | Tsumura | 359/154 |
| 5,357,361 | 10/1994 | Nishizawa | 359/142 |
| 5,416,627 | 5/1995 | Wilmoth | 359/159 |

FOREIGN PATENT DOCUMENTS

| | | | |
|---|---|---|---|
| 0 235 678 A1 | 9/1987 | European Pat. Off. | G08G 1/09 |
| 0 312 010 A2 | 4/1989 | European Pat. Off. | G08G 1/09 |
| 0 322 573 A1 | 7/1989 | European Pat. Off. | G08G 1/09 |

*Primary Examiner*—Jason Chan
*Assistant Examiner*—Mohammad Sedighian
*Attorney, Agent, or Firm*—Oliff & Berridge, PLC

[57] ABSTRACT

In an optical head for optical beacon, a prism 5 is arranged immediately after light emitting elements 1 of an optical head 10 in light radiating directions of the light emitting elements 1, so that the paths along which light rays travel immediately after the radiation can be curved by the prism 5. As a result of this configuration, if the index of refraction of a material of which the prism 5 is made and the angle of a slope of the prism 5 are set to proper values, the light rays can be injected from the prism 5 to an optical head 10 on the side of a light receiving element 2 in arbitrary directions. Further, a surface 21 of a body 13 in which a transmission window 14 is formed is so shaped as to be inclined backward with respect to the travelling direction of an automobile from an upper edge a to a lower edge b. An image of the surface 21 of the body 13 in which the transmission window 14 is formed is not mirrored on a windshield glass 20 as long as the image is that of a surface portion below the upper edge a excluding the upper edge a. Other part of the body 13 than the surface 21 in which the transmission window 14 is formed is subjected to a surface treatment for preventing the mirroring of an image.

9 Claims, 4 Drawing Sheets

OPTICAL HEAD OF OPTICAL BEACON

BACKGROUND OF THE INVENTION

The invention relates to optical beacon systems that implement communication using optical signals, and more particularly to an improved optical head structure installed within an automobile.

An optical beacon is a type of communication system between automobiles and roads using rays of light in the near infrared region. The optical beacon is also a bidirectional communication system that transmits traffic information such as traffic jam and parking area information from the road side to the automobile side and that transmits IDs specific to individual automobiles and the like from the automobile side to the road side.

While beacons include radio beacons using electric waves, optical beacons use light as their transmission medium and space propagation light as their carrier wave, and implements communication by modulating such carrier wave.

An optical beacon uses a light emitting element and a light receiving element as elements in place of an antenna, and receives optical signals from the road side by the light receiving element and transmits optical signals from the automobile side to the road side by the light emitting element. Incidentally, the wavelength of light used is in the near infrared region around 850 nm. While a combination of the light emitting element and the light receiving element or a collective body consisting of a light emitting element and a light receiving element is called an optical beacon antenna, they will hereinafter be referred to simply as the "optical beacon".

By the way, this optical beacon has the basic function of receiving light and emitting light. Therefore, when an optical beacon is enclosed with a body, a transmission window must be formed in the body in order to ensure transmission of light. FIG. 9 is a schematic diagram showing a body 13 of an optical beacon 10 having such a transmission window 14.

FIG. 9 shows a conventional example of an optical head 10 of an optical beacon (hereinafter referred to simply as the "optical head 10") used for automobiles. As shown in FIG. 9, this optical head 10 has a light emitting section 11 and a light receiving section 12 mounted on a single board 3. The light emitting section 11 has an array of light emitting elements 1 that are constructed of LEDs (light-emitting diodes), and the light receiving section 12 has a large area light receiving element 2 constructed of a PD (photodiode). In FIG. 9, reference numeral 13 denotes a body and 14, a transmission window for transmission and reception of light.

As shown in FIG. 10, this mounting board 3 is disposed so as to be inclined at an angle corresponding to an optimal directive angle of the optical head 10 with respect to the upper surface of a substantially horizontal installation surface within an automobile, e.g., the upper surface of an instrument panel so that the transmission and reception efficiency of the light emitting elements 1 and the light receiving element 2 (hereinafter referred to simply as the "optical element" collectively whenever applicable) is optimized. In general, the optimal directive angle of the optical head 10 is set to, e.g., 43°±10° with respect to a horizontal plane.

Further, the reason why the LEDs are arrayed is not only to increase the sum total of energy but also to make a fine adjustment of the directive angle as a whole by individually setting the mounting angles of the respective LEDs as shown in FIG. 10. In FIG. 10, the arrows indicate light emitting directions.

While the light emitting elements 1 and the light receiving element 2 are arranged on a single board 3 in the example shown in FIG. 9, they may not necessarily be arranged in such a manner. The light emitting elements 1 and the light receiving element 2 may be arranged in any mode as long as such mode allows rays of light to be transmitted and received through the transmission window 14 formed in a surface 21 of the body 13 confronting the windshield glass surface when the light emitting elements 1 and the light receiving element 2 are accommodated in the body 13 such as shown in FIG. 10.

A road-side optical beacon unit 52 and an automobile-side optical beacon unit 51 are arranged as shown in FIG. 11, respectively, and the directive angle of the antenna of the automobile-side unit 51 is required to be set to 43°±10° with respect to a horizontal plane. If the body 13 of the optical beacon 10 is to be arranged inside the automobile room, the optical beacon 10 can most advantageously keep this directive angle when placed on the upper surface of an instrument panel 23 that confronts a windshield glass 20 such as shown in FIG. 12. Almost all the body 13 of the optical beacons 10 are disposed on the upper surface of the instrument panel 23 that is substantially horizontal.

In this case, a problem arises. That is, when an additionally arranged part such as the body 13 is disposed on the upper surface of the instrument panel 23, a reflected image a'b' of (the surface 21 of) the body 13 is mirrored on the windshield glass 20 to thereby disturb the view of a driver D. As generally taken measures to this problem, light is scattered by, e.g., embossing the surface of the body 13 in order to control the reflectance of the surface of the body 13, or the surface pattern of the body 13 is made analogous to that of the instrument panel 23 in order to give continuity to the instrument panel 23, or the number of partings is reduced, etc.

However, since the region occupied by the transmission window 14 for light transmits light, no surface treatments such as described above can be given to this region. Therefore, a reflected image of this region is, in any way, formed on the windshield glass 20 to thereby disturb the view of the driver D.

Furthermore, the above-mentioned conventional optical head 10 has addressed the following problems.

While the mounting board 3 of the optical element must be mounted so as to be inclined with respect to the horizontal surface as described above, the control board 4 and the mounting board 3 must be arranged under different layout systems spacewise as shown in FIGS. 9 and 10, taking into consideration ease with which to operate the control board for controlling the optical element. In this case, the control board 4 and the mounting board 3 are usually formed to be separate pieces.

If these boards 3, 4 are formed into separate pieces, connecting means for connecting these boards 3, 4 mechanically and electrically must be provided separately as well, which in turn complicates the general configuration of the optical head 10 and addresses manufacturing and managing problems.

The arrangement in which the LEDs are arrayed with each LED being inclined at a certain angle addresses a serious problem that the number of manufacturing steps is increased and that management is complicated. Further, if the LEDs must be rearrayed for adjustment of their directive angles after mounted, the LEDs may likely be mechanically deformed due to vibrations or the like during the operation or may likely break connecting electric wires.

Since the PD with a large area not only is expensive but also has a large capacity, its speed of response is low. Further, shot noise increases with increasing area, which in turn impairs S/N ratio.

SUMMARY OF THE INVENTION

An first object of the invention is therefore to prevent the mirroring of reflected images of the body of an optical beacon and the transmission window of the body on the windshield glass without losing the transmitting function of the transmission window of the body, the body being disposed so as to face the windshield glass and the transmission window serving to allow the optical beacon inside the body to implement transmission and reception of optical signals.

A second object of the invention is to overcome these problems and to allow a highly reliable and inexpensive optical head whose directivity is easily adjustable to be manufactured.

To achieve the above object, the invention is characterized in that a surface of a body in which a transmission window is formed, or at least a region in which the transmission window is formed is designed so as to be inclined backward with respect to a travelling direction of an automobile, the inclined surface or region extending from an upper edge to a lower edge thereof. As a result of this arrangement, at least the surface of the transmission window is not mirrored on the windshield glass.

In the aforementioned configuration, a surface treatment for preventing the mirroring of an image on the windshield glass surface may be given to a surface portion of the body excluding the transmission window. As a result of this arrangement, the transmission window of the body and the surface in which the transmission window is formed are not mirrored on the windshield glass.

Further, in the aforementioned configuration, refracting means may be arranged on an inner surface of the transmission window or between the inner surface of the transmission window and the light emitting element and the light receiving element, so that light transmitting and receiving directions can be adjusted, the refracting means serving to change travelling paths of rays of light. A prism may be used as the refracting means.

As a result of this arrangement, if the index of refraction of the refracting means and, when a prism is used as the refracting means, the angle of a slope of the prism are changed or if a like measure is taken, the directions of rays of light emitted from the transmission window of the body can be set arbitrarily. Therefore, light transmission and reception efficiency can be optimized by aligning the directions of transmission of light from the light emitting elements and the direction of reception of light to the light receiving element with the optical axes of these elements (i.e., aligning the directions to be in parallel with the optical axes) independently of where the transmission window is positioned or into which shape the transmission window is formed.

Furthermore, to overcome the aforementioned problems, the invention is characterized in that an optical path of an optical signal emitted from a light emitting element is operated by refracting means so that a desired radiation pattern can be formed. As a result of this configuration, a ray of light from the optical head can be injected in an arbitrary direction independently of how the light emitting element is arranged.

Further, the invention is characterized in that, in an optical head having a plurality of light emitting elements, the refracting means are arranged so as to correspond to the respective light emitting elements so that a desired radiation pattern can be formed as a whole. A prism can be used as the refracting means.

Still further, the invention is characterized in that the refracting means is arranged ahead of the light receiving element so that the refracting means can curve an optical path of the optical signal that is emitted from the light emitting element and that is to be received by the light receiving element in such a manner that the optical signal is converged onto the light receiving element. A converging lens can be used as the refracting means.

As a result of this configuration, the light injected onto the optical head can be converged immediately ahead of the light receiving element, the light receiving area can be reduced compared with an example having no such configuration while keeping the same effective light receiving area.

The refracting means that is arranged in the configurations may be formed by using a transparent body and being integrated with a transmission window, the transparent body forming the transmission window that is arranged in a body of the optical head and that serves for transmission and reception.

DETAILED DESCRIPTION OF PREFERRED EMBODIMENTS

Figure 1:
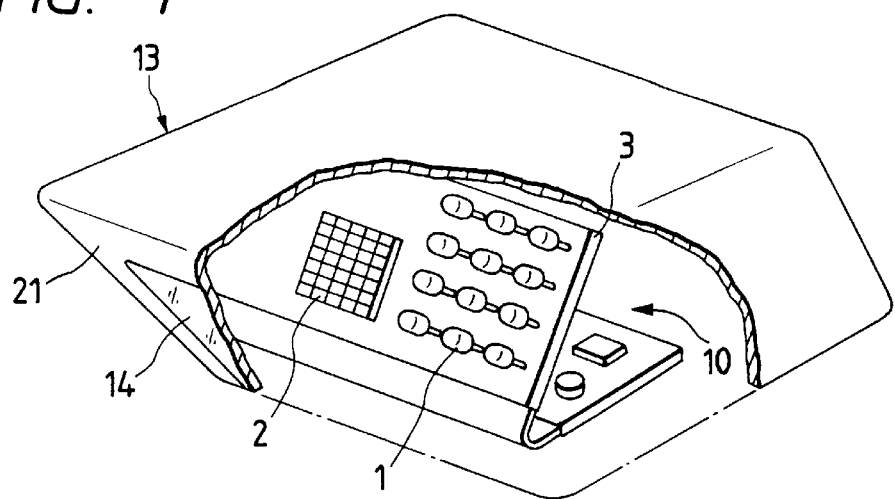
FIG. 1 is a partially cutaway perspective view of a body of an optical beacon according to a first embodiment.

Embodiments of the invention are shown in FIGS. 1 to 8. The same parts and components as those of the conventional example are denoted as the same reference numerals, and descriptions thereof will be omitted.

First of Embodiment

Figure 2:
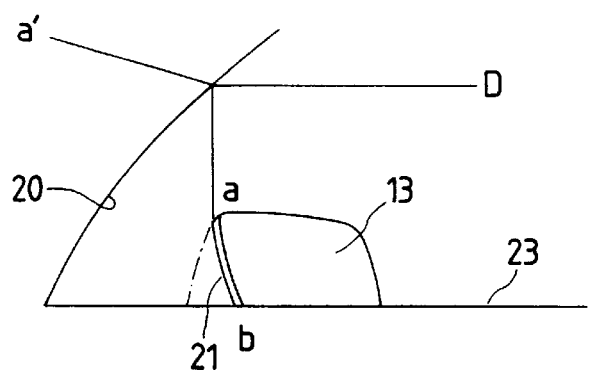
FIG. 2 is a schematic diagram showing the mounting of the optical beacon of the first embodiment.

FIG. 1 shows a body 13 of an optical beacon 10, which is a first embodiment. FIG. 2 is a schematic diagram showing the arrangement of the body 1 on the upper surface of an instrument panel 23 so as to face a windshield glass 20. A surface 21 in which a transmission window 14 of the body 1 serving for transmission and reception is formed is positioned so as to confront a surface of the windshield glass 20. In the body 13 according to this mode of embodiment, the surface 21 in which the transmission window 1 is formed is inclined backward with respect to the automobile travelling direction from an upper edge a to a lower edge b as shown in FIG. 2.

Therefore, an image of the surface 21 of the body 1 in which the transmission window 14 is formed is not mirrored on the windshield glass 20, the image being that of a portion below the upper edge a excluding the upper edge a as indicated by the optical path in FIG. 2 (a reflected image a' of the upper edge a is mirrored). Therefore, a surface treatment for preventing the mirroring of an image on the windshield glass 20 is not required to be given to the surface 21 in which the transmission window 14 is arranged. Therefore, the function of the transmission window 14 for light can be maintained.

Thus, the surface treatment for preventing the mirroring of an image can be given to surfaces other than the surface 21 in which the transmission window 14 is formed. Therefore, if the surface treatment for preventing the mirroring of an image is provided not only on the surfaces other than the surface 21 in which the transmission window 14 is formed but also on the upper edge a of the surface 21 in which the transmission window 14 is formed and if the anti-mirroring configuration (shape) including the aforementioned shape of the surface 21 in which the transmission window 14 is formed is also employed, an image of the body 13 is in no way mirrored on the windshield glass 20.

While the whole part of the surface 21 in which the transmission window 14 is formed is inclined in this embodiment, it may be also acceptable that only the region in which the transmission window 14 is formed on the surface 21, not the whole part of the surface 21, is inclined.

Second Embodiment

Figure 3:
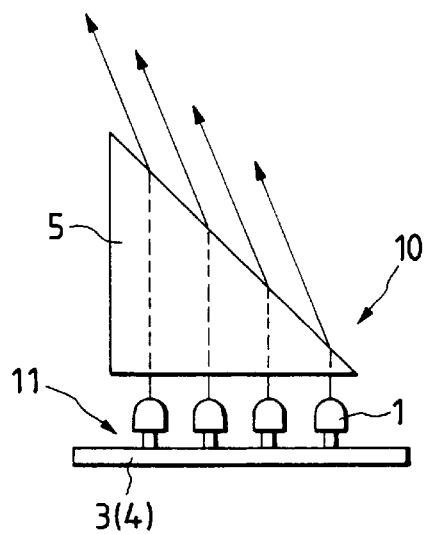
FIG. 3 is a diagram illustrative of the principle on which a second embodiment is based.

As shown in FIG. 3, in this embodiment, a prism 5 is disposed immediately after light emitting elements 1 of an optical head 10 in light radiating directions of the light emitting elements 1, so that the paths along which light rays travel immediately after the radiation are curved by the prism 5.

As a result of this arrangement, if the index of refraction of a material of which the prism 5 is made and the angle of the slope of the prism 5 are set properly, the light rays can be injected from the prism 5 to an optical head 10 on the light receiving side in arbitrary directions. Therefore, the light emitting elements 1 can be arranged in arbitrary positions. As a result, a mounting board 3 on which the light emitting elements 1 are mounted has no longer to be inclined in order to form an optimal radiation pattern.

That is, the mounting board 3 can be located within the same plane as a control board 4. If there is an open space on the control board 4, the light emitting elements 1 can be mounted on the control board 4, which in turn allows the mounting board 3 to be integrated with the control board 4. As a result of this configuration, the problem discussed in the prior art can be overcome. It may be noted that LEDs are used as the light emitting elements 1.

Figure 4:
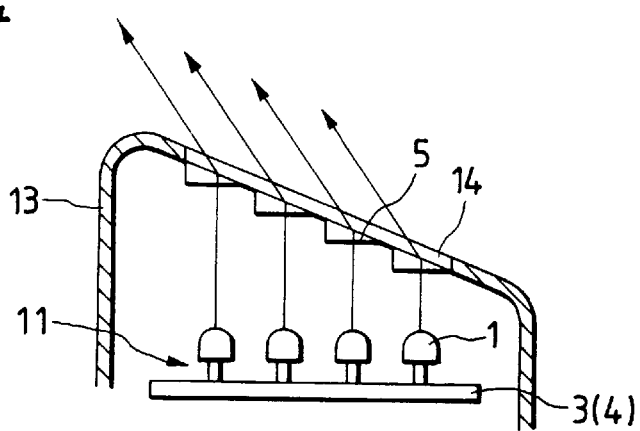
FIG. 4 is a diagram showing a light emitting section of the second embodiment.

Further, when it is necessary to adjust the directivity as a whole by changing the optical paths of rays of light emitted from the individual light emitting elements 1, a plurality of prisms 5 are disposed so as to correspond to the respective light emitting elements 1 and the shapes and mounting directions of these prisms 5 are changed as shown in FIG. 4, so that the directivity as a whole can be adjusted without rearranging the light emitting elements 1.

Therefore, unlike in the case where the directivity is adjusted by relocating the light emitting elements 1 themselves as discussed with respect to the problem in the prior art, there is no danger of mechanically damaging the light emitting elements 1 or breaking the connecting wires in association with the mechanical damage of the light emitting elements 1.

Further, if, instead of using the prisms 5 themselves, the surface of a transparent body, which forms a transmission window 14 in a body of the optical head 10 for transmission and reception, e.g., a transparent resin plate, a glass plate, or the like, is made into a prismatic shape, the aforementioned function can be implemented without increasing the number of parts.

Figure 5:
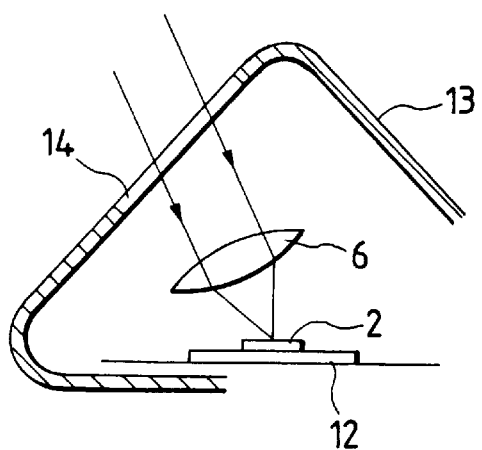
FIG. 5 is a diagram showing a light receiving section of the second embodiment.

On the other hand, with respect to the light receiving element 2, a converging lens 6 is arranged ahead of the light receiving element 2 so that light rays injected onto the optical head 10 is converged to reach the light receiving element 2 as shown in FIG. 5.

This configuration allows the area of the light receiving element 2 itself to be reduced while keeping the same effective light receiving area as in the case where no such configuration is made. Therefore, advantages such as improved speed of response and reduced noise can be obtained. Further, since the light receiving element 2 used is small-sized, the material cost becomes low. Hence, this configuration allows the problem discussed in the prior art to be overcome.

Figure 6:
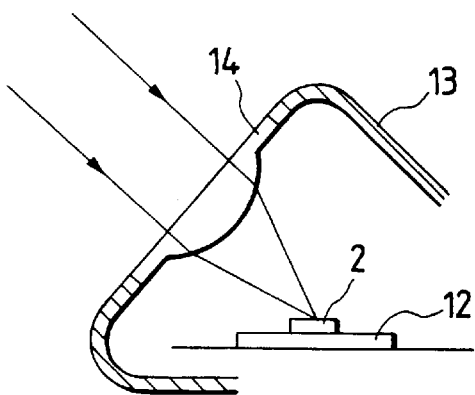
FIG. 6 is a diagram showing a light receiving section of the second embodiment.

Further, FIG. 6 shows a configuration in which the surface of the transmission window 14 is made to be lenslike, instead of arranging the converging lens 6 with respect to the light receiving element 2. As a result of this configuration, the surface of the transmission window 14 can play the role as the converging lens 6. Since the converging lens 6 itself is dispensed with in this configuration, the number of parts can be reduced, and the number of manufacturing steps can be reduced as well.

Third Embodiment

Figure 7:
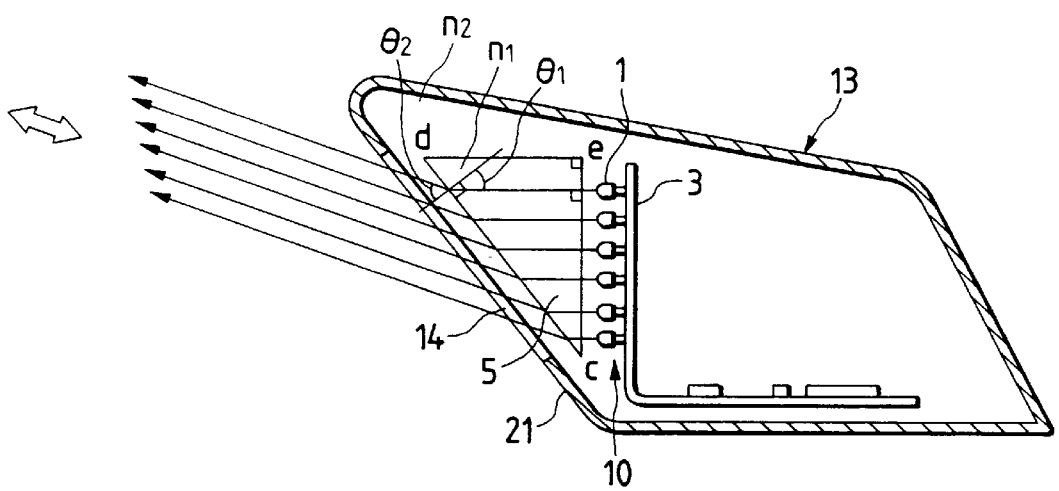
FIG. 7 is a sectional view showing a third embodiment.
Figure 8:
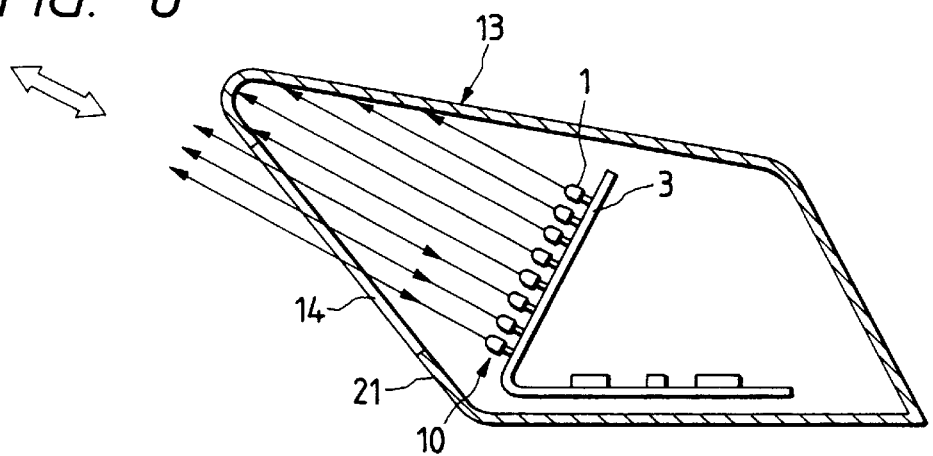
FIG. 8 is a sectional view showing the third embodiment.
Figure 9:
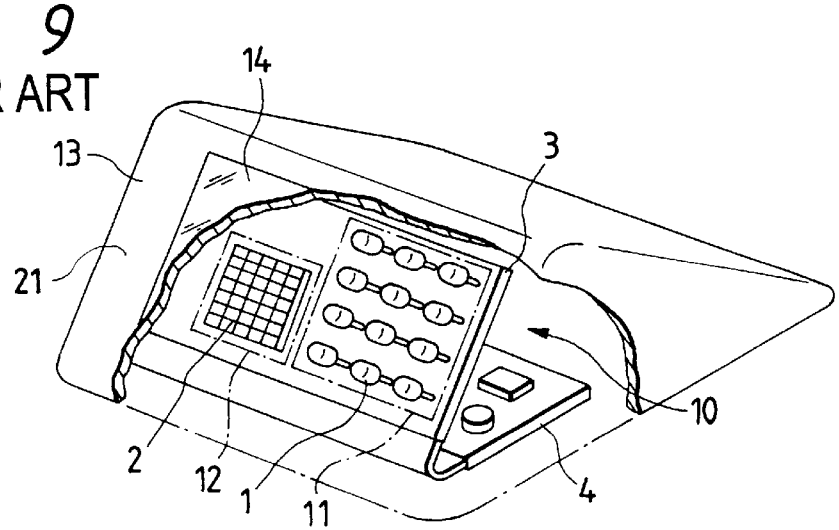
FIG. 9 is a perspective view showing a conventional example.
Figure 10:
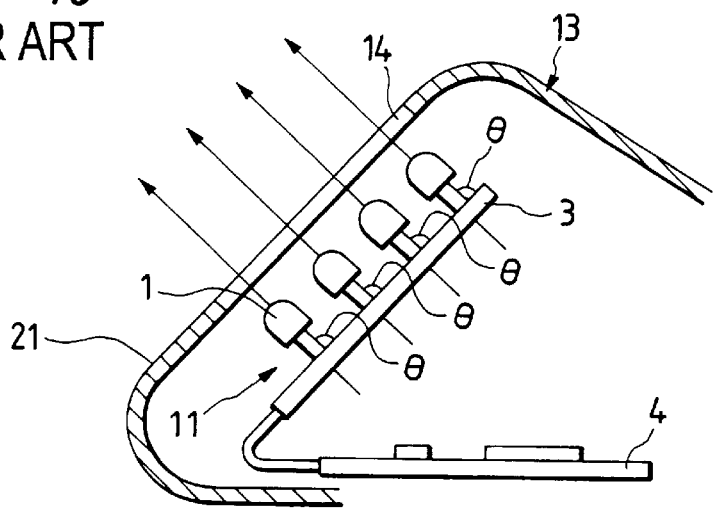
FIG. 10 is a sectional view showing the conventional example.
Figure 11:
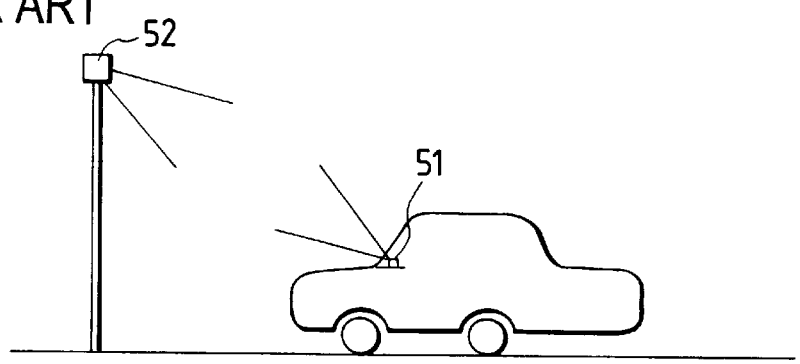
FIG. 11 is a schematic diagram imaging transmitting and receiving conditions with the optical beacon.
Figure 12:
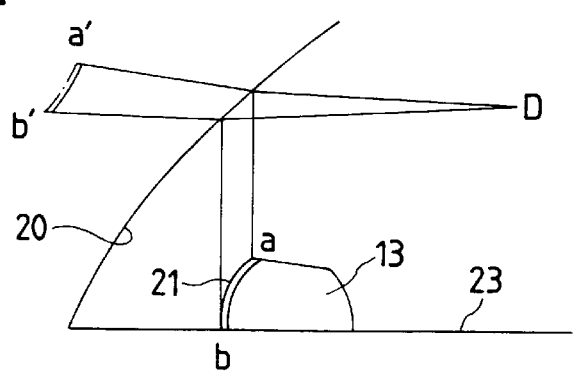
FIG. 12 is a schematic diagram showing inconvenience encountered in the conventional example.

In a third embodiment, a prism 5 is arranged close to the inner surface of the transmission window 1 as shown in FIG. 7, in addition to the shape of the body 13 according to the first mode of embodiment, so that rays of light emitted from light emitting elements 1 or a ray of light heading toward a light receiving element 2 within the body 13 from a transmitter outside the automobile pass through this prism 5 and the travelling paths thereof are curved. As a result of this configuration, the optical paths can be curved in obliquely upward, optimal transmitting and receiving directions, e.g., in the case shown in FIG. 7. That is, if the prism 5 is not arranged, the surface 21 in which the transmission window 14 is formed is inclined, so that the travelling of rays of light in the optimal transmitting and receiving directions indicated by the thick arrows in FIG. 8 from the light emitting elements 1 and to the light receiving element 2 are shielded. However, if the prism 5 is arranged, the optical paths can be curved in the optimal transmitting and receiving directions, thereby allowing transmission and reception efficiency to be optimized independently of the inclination of the transmission window 21 or the surface 21 in which the transmission window 21 is formed.

Incidentally, rays of light emitted from the light emitting elements 1 (LEDs) within the body 13 and injected perpendicularly from a surface ce of the prism 5 reach a surface cd of the prism 5 and then are projected outside the automobile after curved in accordance with Snell's law shown in equation (1) below. It is assumed that an angle of incidence and an angle of projection with respect to the surface cd are $\theta_1, \theta_2$ and that the index of refraction of the prism 5 and that of air are $n_1, n_2$, respectively, then $$n_1 \cdot \sin\theta_1 = n_2 \cdot \sin\theta_2 \quad (1)$$

The same applies when light is injected into the body 13 from outside the automobile. In order to change the curving degree, prisms 5 whose angles of slopes and indices of refraction are different may be used.

While the prism 5 is arranged so as to be secured to the inner surface of the transmission window 14 in this embodiment, the prism 5 may be arranged in other modes as well. The prism 5 may be arranged in a space between an optical antenna and the transmission window 14. The prism 5 may be arranged in any mode as long as such mode allows the travelling paths of light to be curved.

As described in the foregoing, according to the invention, the body of an optical beacon is formed in such a manner that either a surface thereof in which a transmission window for transmission and reception is formed or a surface extending at least from the upper edge to the lower edge of the region in which the transmission window is formed is inclined backward with respect to the travelling direction of the automobile. Therefore, even if such a body is installed on the instrument panel, the transmission window or the surface in which the transmission window is formed is not mirrored on the windshield glass, and other part of the body may be subjected to a surface treatment for preventing the mirroring of a reflected image. As a result, by providing such a surface treatment and by adopting the aforementioned transmission window design, the mirroring of a reflected image on the windshield glass can be prevented. Hence, the driver's view is in no way disturbed by the reflected image.

Further, according to the invention, refracting means is disposed immediately after the light emitting elements of an optical head in light radiating directions of the light emitting elements, and directivity is adjusted by operating the optical paths through the ref racting means. Therefore, the light emitting elements can be mounted at arbitrary positions, and the light emitting elements can be mounted on an open space on a control board without providing a mounting board dedicated to the light emitting elements. Hence, a compact configuration can be achieved. In addition, unlike in the conventional example in which directivity is adjusted on the side of the light emitting elements, there are no losses or the like of the light emitting elements during adjustment, which in turn contributes to providing a highly reliable, easy-to-adjust optical head.

On the side of the light receiving element also, light rays injected onto the light receiving element are converged by arranging refracting and converging means ahead of the light receiving element. Therefore, unlike in the conventional example in which there is no such means, the area of the light receiving element itself is reduced in order to obtain the same effective light receiving area. As a result, speed of response can be improved, and shot noise can be suppressed. The light receiving element can be inexpensive as well.

What is claimed is:

1. An optical head of an optical beacon comprising:

light emitting means for transmitting an optical signal;

light receiving means for receiving an optical signal; and a body for accommodating said light emitting means and said light receiving means, said body having a bottom and a transmission window formed so as to confront a windshield glass surface of an automobile, the transmission window allowing the light emitting element and the light receiving element to effect transmission and reception to and from an external source through the transmission window;

wherein at least one of a surface of the body in which the transmission window is formed and a region in which the transmission window is formed extends in a direction which is substantially opposite to a direction of extension of the windshield glass surface relative to a plane that is perpendicular to the bottom of the body.

2. The optical head as claimed in claim 1, wherein a surface treatment for preventing the mirroring of an image on the windshield glass surface is given to a surface portion of the body excluding the transmission window.

3. The optical head as claimed in claim 1, further comprising refracting means for changing a travelling path of the light to adjust light transmitting and receiving directions, said refracting means being arranged on an inner surface of the transmission window or between the inner surface of the transmission window and the light emitting element and the light receiving element.

4. The optical head as claimed in claim 3, wherein a prism is used as the refracting means.

5. An optical head of an optical beacon comprising:

light emitting means for transmitting an optical signal;

light receiving means for receiving an optical signal;

light refracting means for changing an optical path of the optical signal emitted from the light emitting element so that a desired radiation pattern can be formed, the light refracting means being a prism; and a body for accommodating said light emitting means, said light receiving means, and said light refracting means, said body having a bottom and a transmission window formed so as to confront a windshield glass surface of an automobile, at least one of a surface of the body in which the transmission window is formed and a region in which the transmission window is formed extending in a direction which is substantially opposite to a direction of extension of the windshield glass surface relative to a plane that is perpendicular to the bottom of the body.

6. The optical head as claimed in claim 5, wherein the optical head has a plurality of light emitting elements, and the refracting means are arranged so as to correspond to the respective light emitting elements so that a desired radiation pattern can be formed as a whole.

7. The optical head as claimed in claim 5, wherein the refracting means is arranged ahead of the light receiving element so that the refracting means can curve an optical path of the optical signal that is emitted from the light emitting element and that is to be received by the light receiving element in such a manner that the optical signal is converged onto the light receiving element.

8. The optical head as claimed in claim 5, wherein the refracting means is formed by using a transparent body and being integrated with a transmission window, the transparent body forming the transmission window being arranged in a body of the optical head and serving for transmission and reception.

9. The optical head as claimed in claim 7, wherein a converging lens is used as the refracting means.

* * * * *